Feb. 6, 1951 E. J. BERGER ET AL 2,540,645

DRIVE MECHANISM FOR KNITTING MACHINES

Filed Oct. 15, 1947 9 Sheets-Sheet 1

WITNESSES
Thomas W. Kerr, Jr.
A. J. Brittingham

INVENTORS:
Emil J. Berger &
Howard K. West,
BY Paul & Paul
ATTORNEYS.

Feb. 6, 1951 E. J. BERGER ET AL 2,540,645

DRIVE MECHANISM FOR KNITTING MACHINES

Filed Oct. 15, 1947 9 Sheets-Sheet 2

WITNESSES
Thomas W. Kerr, Jr
A. J. Brittingham

INVENTORS:
Emil J. Berger &
Howard K. West,
BY Paul & Paul
ATTORNEYS.

Feb. 6, 1951 E. J. BERGER ET AL 2,540,645

DRIVE MECHANISM FOR KNITTING MACHINES

Filed Oct. 15, 1947 9 Sheets-Sheet 3

INVENTORS:
Emil J. Berger &
Howard K. West,
BY Paul & Paul
ATTORNEYS.

Feb. 6, 1951 E. J. BERGER ET AL 2,540,645

DRIVE MECHANISM FOR KNITTING MACHINES

Filed Oct. 15, 1947 9 Sheets-Sheet 4

WITNESSES

Thomas W. Kerr Jr.

A. J. Brittingham

INVENTORS:

Emil J. Berger &

Howard K. West,

BY

Paul & Paul

ATTORNEYS.

Feb. 6, 1951 E. J. BERGER ET AL 2,540,645

DRIVE MECHANISM FOR KNITTING MACHINES

Filed Oct. 15, 1947 9 Sheets-Sheet 5

WITNESSES:
Thomas W. Kerr, Jr.
A. J. Brittingham

INVENTORS:
Emil J. Berger &
Howard K. West,
BY Paul & Paul
ATTORNEYS.

Feb. 6, 1951 E. J. BERGER ET AL 2,540,645

DRIVE MECHANISM FOR KNITTING MACHINES

Filed Oct. 15, 1947 9 Sheets-Sheet 6

WITNESSES

Thomas W. Kerr, Jr.

A. J. Brittingham

INVENTORS:

Emil J. Berger &

Howard K. West,

BY Paul & Paul

ATTORNEYS.

DRIVE MECHANISM FOR KNITTING MACHINES

Filed Oct. 15, 1947 9 Sheets-Sheet 7

WITNESSES
Thomas W. Kerr, Jr.
A. J. Brittingham

INVENTORS:
Emil J. Berger &
Howard K. West,
BY Paul & Paul
ATTORNEYS.

DRIVE MECHANISM FOR KNITTING MACHINES

Filed Oct. 15, 1947 9 Sheets-Sheet 8

WITNESSES

Thomas W. Kerr, Jr.

A. J. Brittingham

INVENTORS:
Emil J. Berger &
Howard K. West,

BY Paul & Paul

ATTORNEYS.

Feb. 6, 1951 E. J. BERGER ET AL 2,540,645

DRIVE MECHANISM FOR KNITTING MACHINES

Filed Oct. 15, 1947 9 Sheets-Sheet 9

WITNESSES

Thomas W. Kerr, Jr.

A. J. Brittingham

INVENTORS:
Emil J. Berger &
Howard K. West,

BY Paul & Paul

ATTORNEYS.

Patented Feb. 6, 1951 2,540,645

UNITED STATES PATENT OFFICE 2,540,645

DRIVE MECHANISM FOR KNITTING MACHINES

Emil J. Berger and Howard K. West, Lansdale, Pa., assignors to Dexdale Hosiery Mills, Lansdale, Pa., a corporation of Pennsylvania Application October 15, 1947, Serial No. 779,947

7 Claims. (Cl. 66—82)

This invention relates to drive mechanism for knitting machines. More particularly, it is concerned with drive mechanism for straight knitting machines such as are ordinarily employed in the production of flat full fashioned stocking blanks and the like.

The chief aim of our invention is to provide a simple and reliable electrically-powered drive mechanism which can be readily adapted to existing knitting machines of the kind referred to, at relatively small cost; which is automatically operative to vary the speed of the machines as may be required or desired during various phases of a stocking knitting cycle; which will yield in the event that the drive shafts of the machines become locked or jammed for any reason; and which will automatically stop in the event of mal-operation of the sinker actuating catch bars of the machines.

How the foregoing and other objects and advantages are realized in practice will appear from the following detailed description of the attached drawings, wherein Fig. 1 is a fragmentary view in front elevation, of a straight knitting machine embodying our improved drive mechanism.

Figures 1, 2:
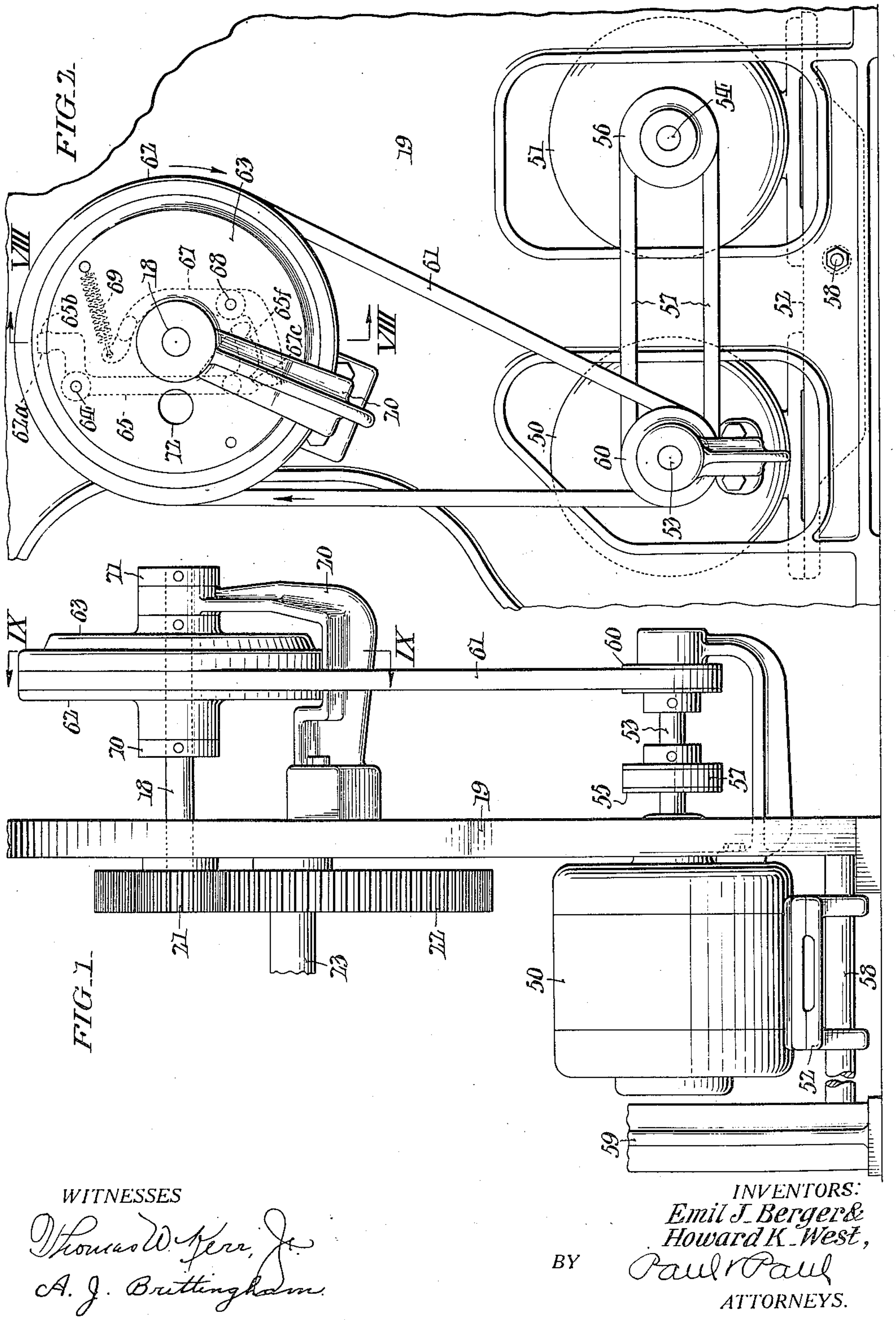
Fig. 2 is a fragmentary view showing the organization in end elevation.

The knitting machine chosen for convenience of exemplifying our invention is of the type disclosed in U. S. Patent No. 1,982,991 granted to Kenneth Howie and Charles C. Krieble on December 4, 1934. The drive shaft of the machine indicated at 18 (Figs. 1 and 2) is rotatively supported between a side frame 19 and an affixed outboard bearing bracket 20. Through speed reduction spur wheels 21 and 22 (Fig. 1) the shaft 18 communicates motion to the main cam shaft 23 which is journalled in bearings respectively afforded by the frame 19 and the corresponding frame 24 at the opposite side of the machine. Mounted on the main cam shaft 23 are the usual rotary cams 25 and 26 by which the necessary lift and horizontal movements are imparted to the catch bar 27 through the interposed elements 28, 29, 30, 31, 32, and 33 respectively. The catch bar 27 actuates the sinkers 35 and dividers 36 (see Figs. 14–17) in proper timed relation with the knitting needles 37 to kink the knitting yarn after a manner well understood in the art. The usual narrowing chain 38 (Figs. 3–6) of the machine is trained about a sprocket wheel 39 and intermittently rotated by racking mechanism whereof the ratchet wheel only is shown at 40 in Fig. 4. The sprocket wheel 39 is mounted on a longitudinally-extending shaft 42 in the lower part of the machine alongside of a drum 41 which is free on said shaft, said drum having ratchet teeth 43 arranged to be picked by a pawl 44 under control of the narrowing chain 38, likewise in the usual manner. Axial shifting of the cam shaft 23, as required during fashioning phases of the knitting, is accomplished by mechanism 45 which is controlled through actuation of a finger 46 by cam lugs such as shown at 47, on the chain 38. The finger 46 is fulcrumed on a fixed stud 48 which has an upward projection 46*a* whereto a horizontal link 49 is connected at one end. Each time that a chain lug 47 passes beneath the finger 46, the rod 49 is shifted to the right whereby the means 45 is caused to carry out its cam shaft shifting function in the way clearly set forth in the Howie et al. patent, supra.

Figures 8, 9, 10, 11, 12, 13:
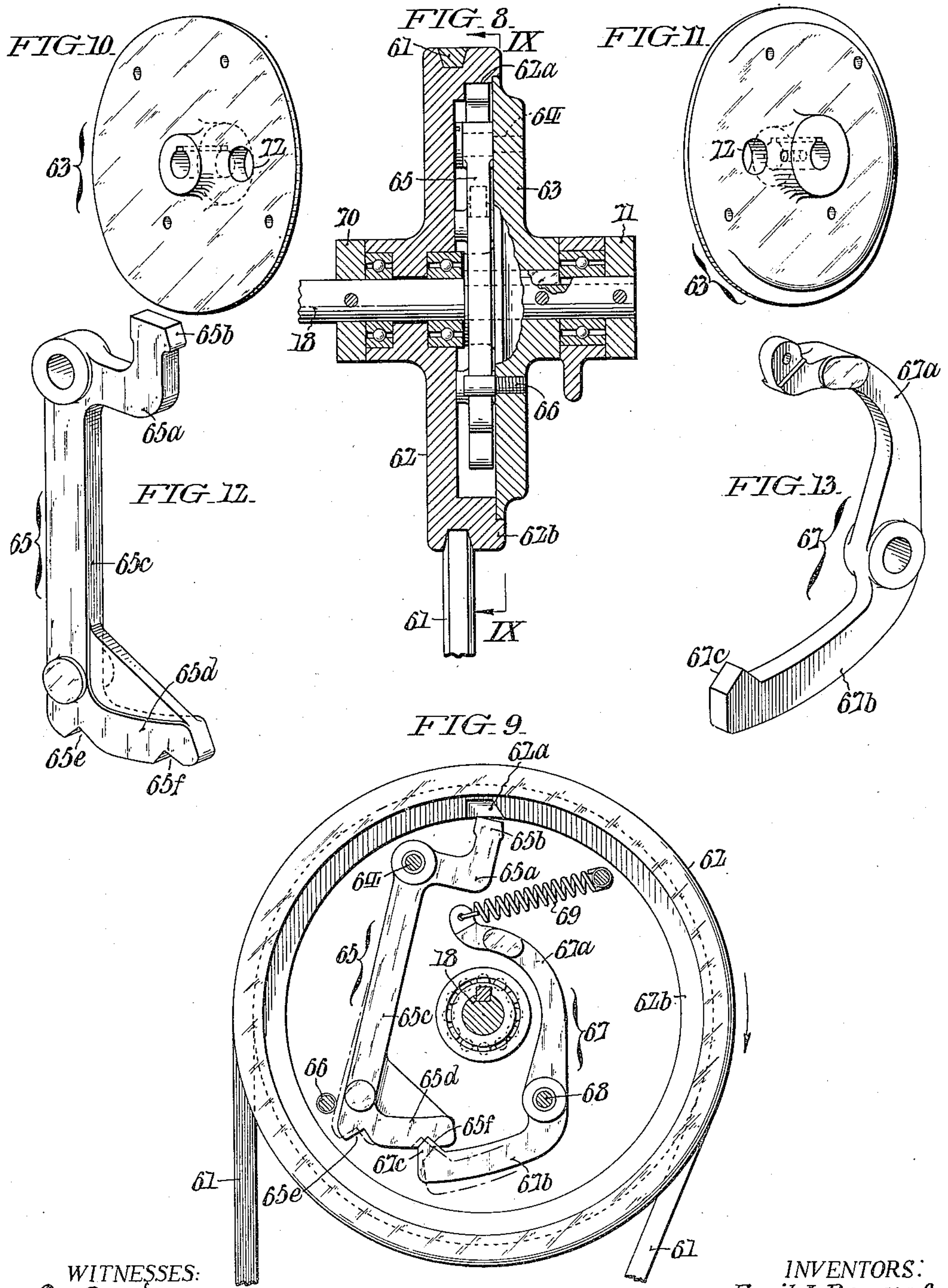
Fig. 8 is a sectional view taken as indicated by the angled arrows VIII—VIII in Fig. 2 of a clutch means embodied in the drive mechanism.
Fig. 9 is a sectional view taken as indicated by the angled arrows IX—IX in Figs. 1 and 8.
Figs. 10–13 are perspective views of different components of the clutch means

The drive mechanism with which our invention is more particularly concerned, includes high and low speed electric motors 50 and 51 which are supported in the interval between the frames 19 and 24 on a bed 52. As shown the shafts 53 and 54 of the motors 50 and 51 are provided with wheels 55 and 56 which are connected by a belt 57. The bed 52 is pivoted on a rod 58 whereof one end is fixed in the side frame 19 near the bottom (see Figs. 1 and 2), and the other end is fixed in a smaller auxiliary frame 59. Secured to the shaft 53 of motor 50 is a second wheel 60, which, by means of a belt 61, is connected to a larger wheel 62 freely mounted on the drive shaft 18 of the machine between the side frame 19 and the outboard bearing bracket 20. The belt 61 is maintained in tension by the weight of motor 50 which over balances the weight of the motor 51 as a consequence of the off center pivoting of the bed 52, see Fig. 2. Keyed to the shaft 18 alongside the wheel 62 is a disk 63 whereto is pivoted at 64, a lever 65. The short arm 65a of the lever 65 is formed with a beveled finger 65b, which, when engaged with a notch 62a internally of a peripheral flange 62b of the sheave 62 as is normally the case, causes the disk 63 and the shaft 18, whereto the latter is secured, to rotate. The long arm 65c of lever 65 terminates in a sector projection 65d in concentric relation to its fulcrum 64. The outward swing of the lever 65 is limited by a stop stud 66 projecting from the disk 63 which latter also carries a detent or latch lever 67 whereof the fulcrum is indicated at 68. As shown, the latch lever 67 is in the form of a bell crank, and by means of a spring 69 influential upon its long arm 67a, said lever is urged clockwise so that its short arm 67b is maintained in yielding engagement with the sector projection 65d of lever 65. At its outer end, the short arm 67b of the latch lever 67 has a bevel tooth projection 67c adapted to enter one or the other of two notches 65e and 65f in the sector projection 65d of lever 65. The collars indicated at 70 and 71 serve to prevent axial displacement of the wheel and clutch assemblage 62, 63 on the shaft 18. As before stated, the disk 63 is normally clutched to the wheel 62 with the finger 65b of lever 65 engaged in the notch 62a as shown in Fig. 2, said lever at such time being so held by engagement of its notch 65e by the tooth 67c of latch lever 67. In the event that the machine should become jammed for some reason with attendant stalling of shaft 18, the bevel surface of the notch 62a in sheave 62, in reacting upon the bevel on the finger 65b of lever 65, will cause the latter to be swung to the position shown in Fig. 9. By engagement at the same time of the tooth 67c of latch lever 67 with the notch 65f in lever 65 also as in Fig. 9, the latter will be restrained, whereupon the wheel 62 will revolve idly about the shaft 18 under drive of belt 61. After the difficulty has been corrected in the machine, the clutch is re-set by restoring the lever 65 to the normal position in which it is shown in Fig. 2 with the aid of a screw driver or other convenient implement inserted through an aperture 72 provided for the purpose in disk 63.

Figure 18:
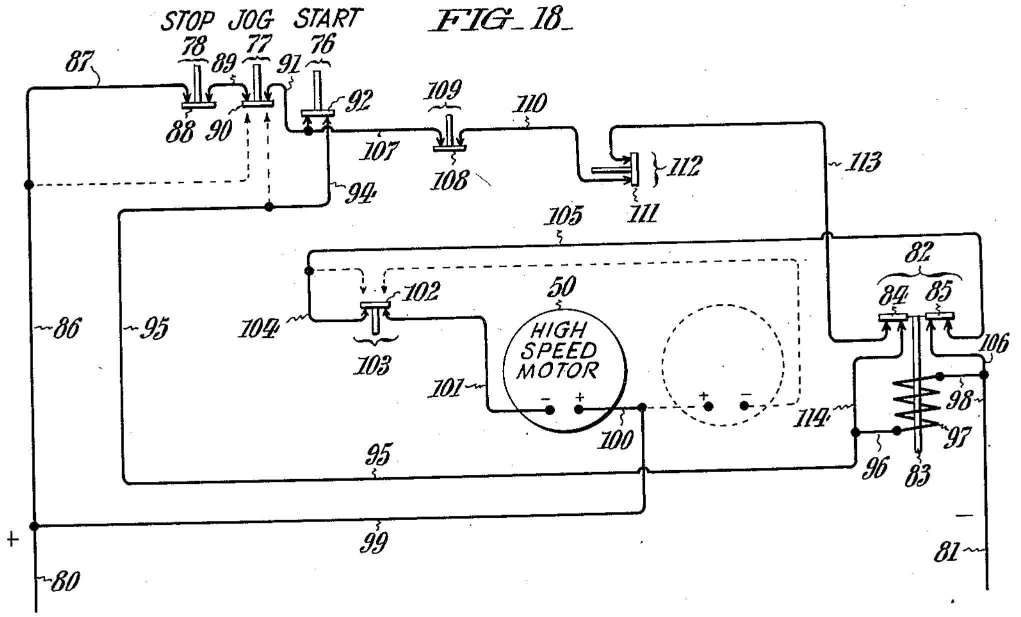
Figs. 18–22 are diagrammatic views showing the electric connections under different conditions of operation.
Figure 19:
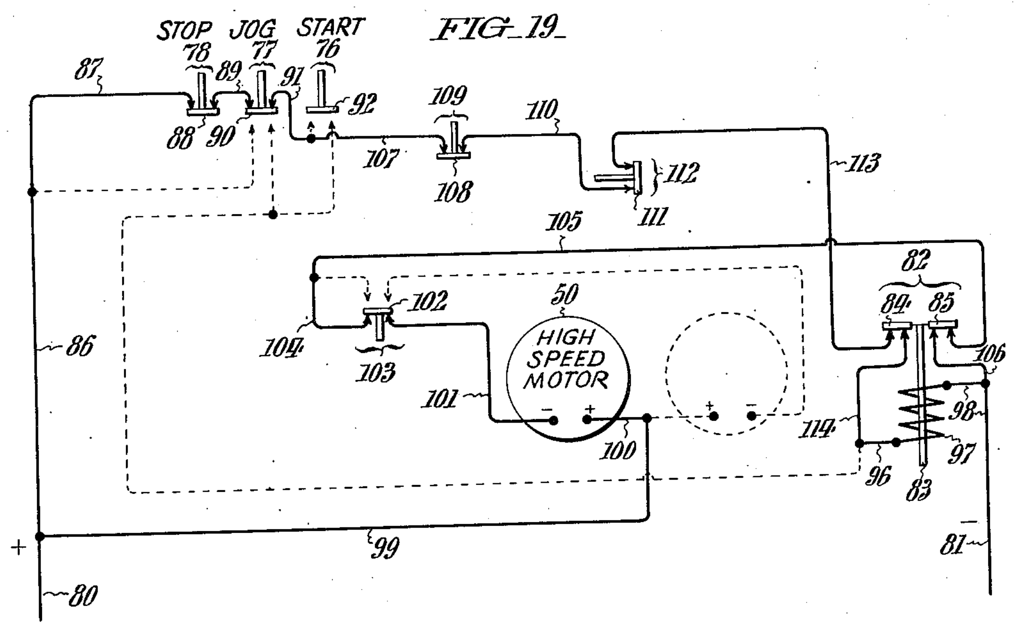

For the manual control of the drive mechanism, we have provided a switch box 75 (see Fig. 3) which for convenience of ready access, is mounted on the bracket projection 19a at the top of side frame 19, and which has "start," "jog," and "stop" push buttons 76, 77 and 78 respectively. Electric current for operating the motors 50 and 51 is supplied through line conductors 80 and 81. Interposed in the circuit wiring to the motors is a relay 82 whereof the armature 83 is arranged to operate two contact switches 84 and 85. With the parts positioned as in Fig. 3, pushing of the Start button 76 and closing of its switch 92 results in connection of the high speed motor 50 across the line 80 and 81. The current flow under this condition will be as shown in full lines in Fig. 18, i. e., from the line conductor 80 through leads 86, 87, contact 88 of button switch 78, lead 89, contact 90 of push button switch 77, lead 91, contact 92 of push button switch 76, leads 94, 95, 96 coil 97 of relay 82, and lead 98 to the line conductor 81. By consequent energization of relay coil 97 and operation of its armature 83, current will in turn flow from line conductor 80 through leads 99, 100, motor 50, lead 101, contact 102 of another switch 103 (to be later more particularly referred to), leads 104 and 105, contact 85 of relay 82, and lead 106 to line conductor 81. Upon release of the "Start" button 76 as in Fig. 19, the coil of relay 82, will be held energized to keep the high speed motor 50 running by current flow in a branch or holding circuit which includes the lead 107, the contact 108 of a second supplemental switch 109 located in the control box 75, lead 110, the contact 111 of a third supplemental switch 112, lead 113, contact 84 of relay 82 and lead 114. Pressure upon the "Stop" button 78 will result in interruption of current flow in the first described circuit through coil 97 of relay 82 and hence in stoppage of the motor 50.

Figure 3:
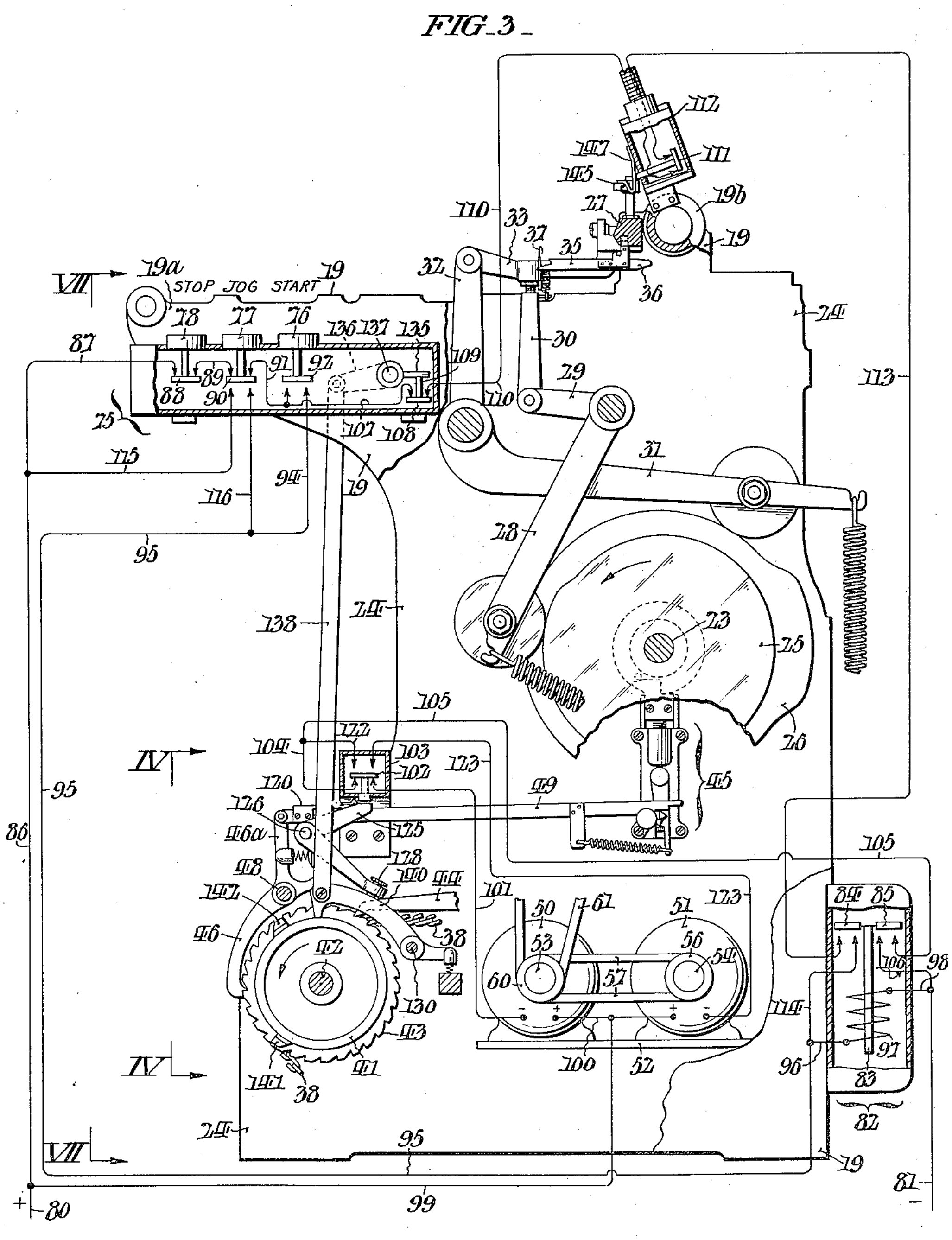
Fig. 3 is a cross section of the machine mechanism with the electric appurtenances diagrammatically indicated.
Figure 20:
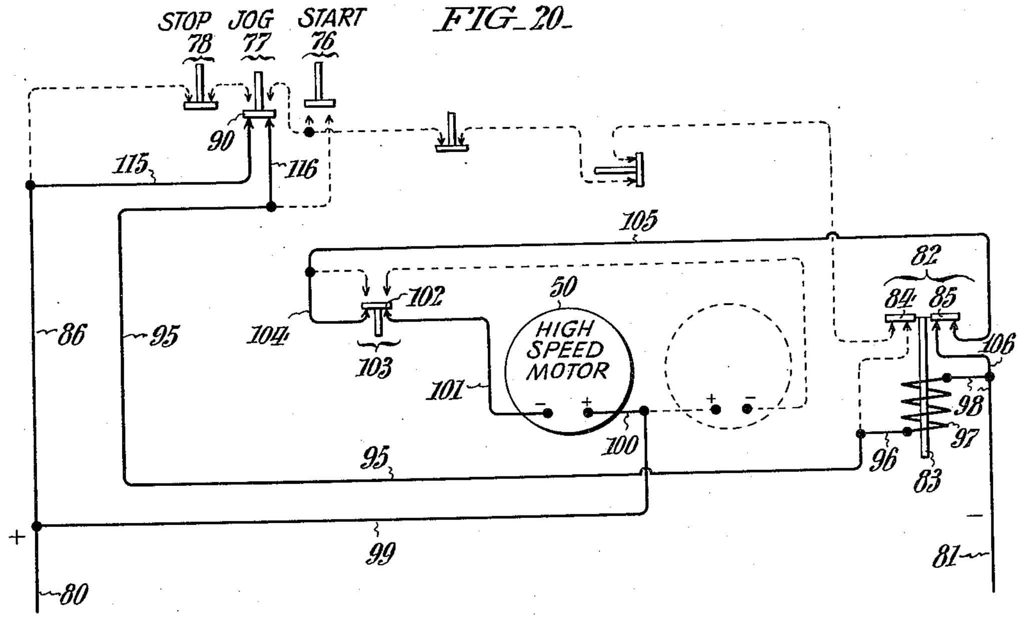

On the other hand, with the machine at a stand still and the parts positioned as in Fig. 3, pressure upon the "Jog" button 77 as in Fig. 20 will be attended by current flow from the line conductor 80, through the leads 86, 115, 116, 95, 96, relay coil 97 and lead 98 to line conductor 81, whereby the relay 82 will be energized to establish current flow to motor 50 via the leads 99, 100, 101, contact 102 of switch 103, conductors 104, 105, relay contact 85 and 106. It is to be noted however that when the "Jog" button 77 is released, the circuit is broken to stop current flow to the high speed motor 50 which will consequently come to a standstill. In this way, the machine can be intermittently "jogged" under power of the motor 50 as may be required for setting up purposes or in making adjustments. During the various manipulations just described, the slow speed motor 51 simply runs idly under the drive of the high speed motor 50 through the medium of belt 57.

Figure 21:
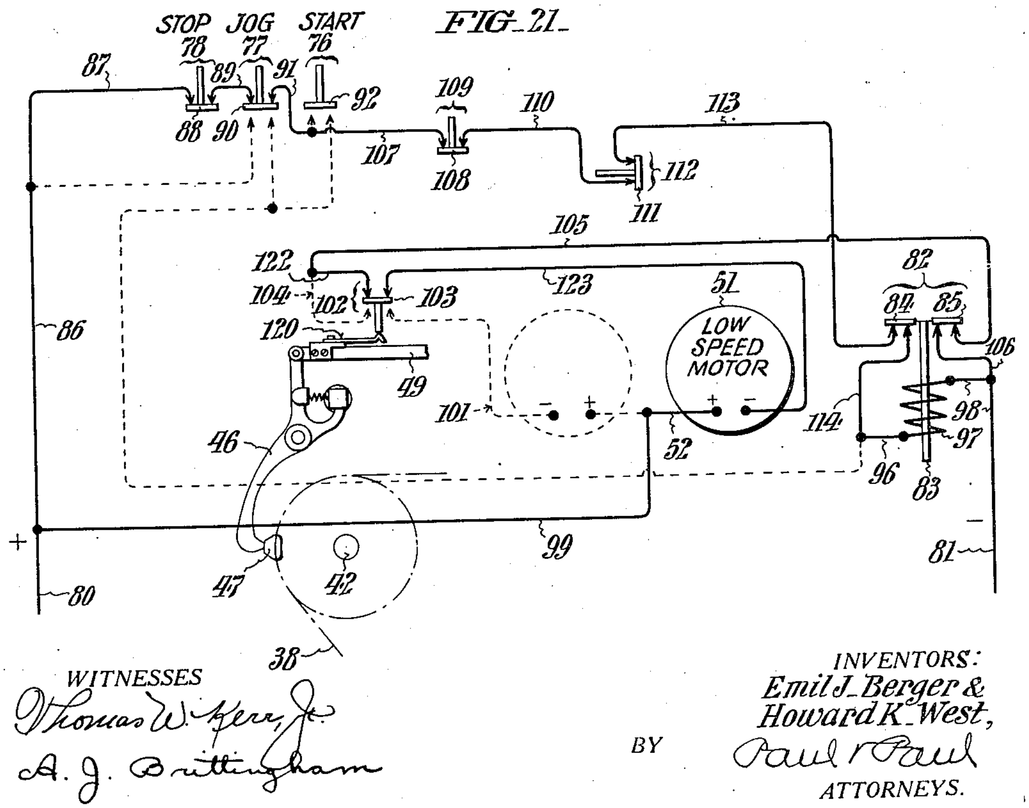

The supplemental switch 103 is relied upon to throw the drive of the machine from the high speed motor 50 to the slow speed motor 51 for example, during the fashioning phases of the knitting. The switch 103 is arranged to be operated by a spring tongue piece 120 see Figs. 3 and 6 which is secured to the link 49 of the cam shaft shifting mechanism 45. When the link 49 is moved to the right for actuation of the means 45, the upstanding cam projection 120a of the spring tongue 120 lifts the contact 102 of switch 103 as shown in Fig. 21. As a consequence, the branch circuit 104, 101 leading to the high speed motor 50 is broken, while at the same time current flow to the low speed motor 51 is established by way of a branch circuit 122, 123 as shown in Fig. 21. At these times the high speed motor 50 simply idles under drive of the low speed motor by the belt 57.

Figure 22:
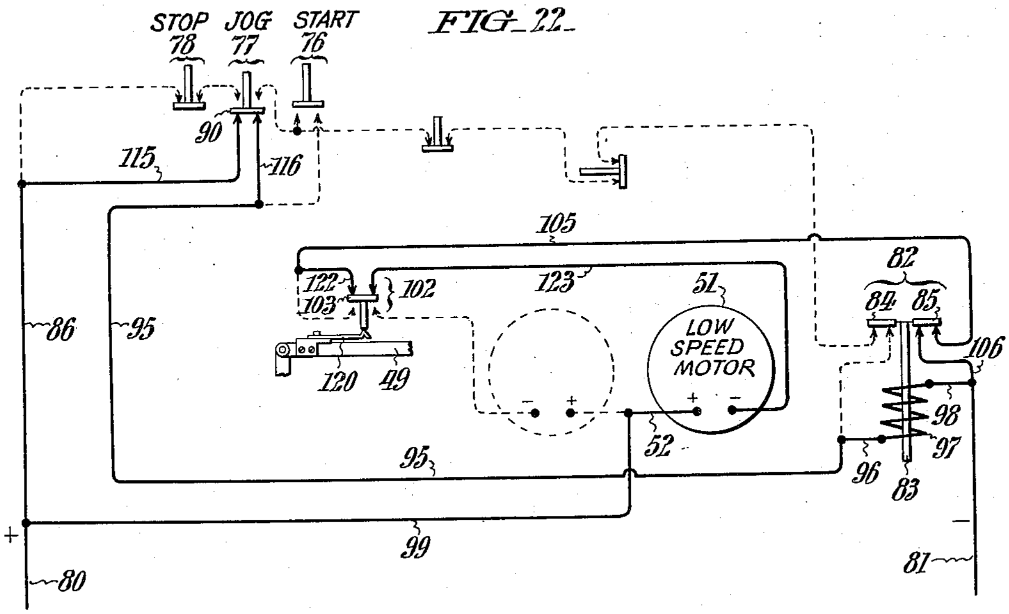

With the switch 102 set as in Fig. 21, it is possible to stop the machine by pushing the button 78, and to subsequently jog it slow speed by manipulating button 77 in a manner readily understood from Fig. 22. Also by pushing button 76, the machine can be restarted to continue running at slow speed until the cam lug 47 on the chain 38 passes from beneath the finger 46.

Figures 4, 5:
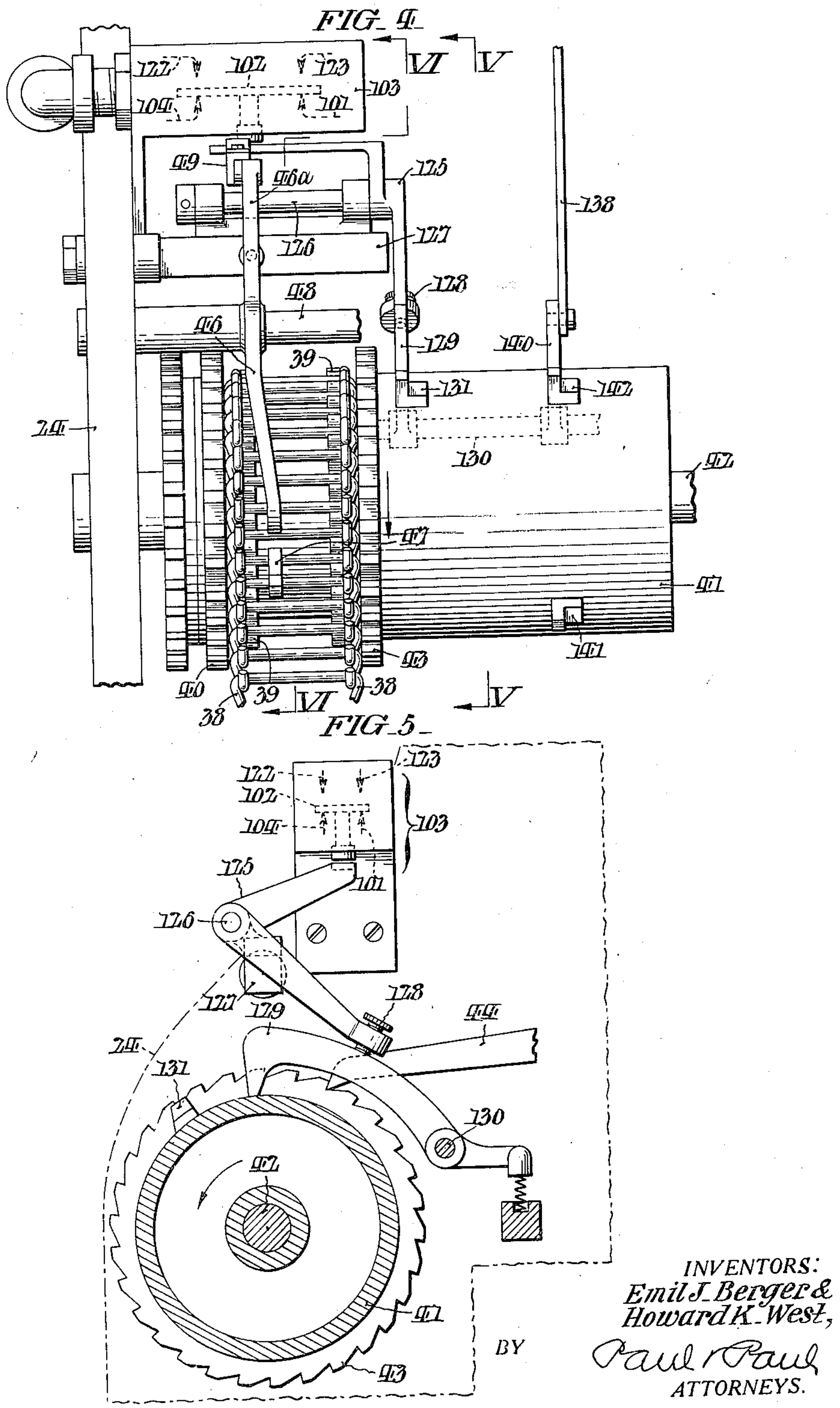
Fig. 4 is a fragmentary view in elevation looking as indicated by the angled arrows IV—IV in Fig. 3.
Figs. 5 and 6 are fragmentary views in section taken as indicated respectively by the angled arrows V—V and VI—VI in Fig. 4.
Figure 6:
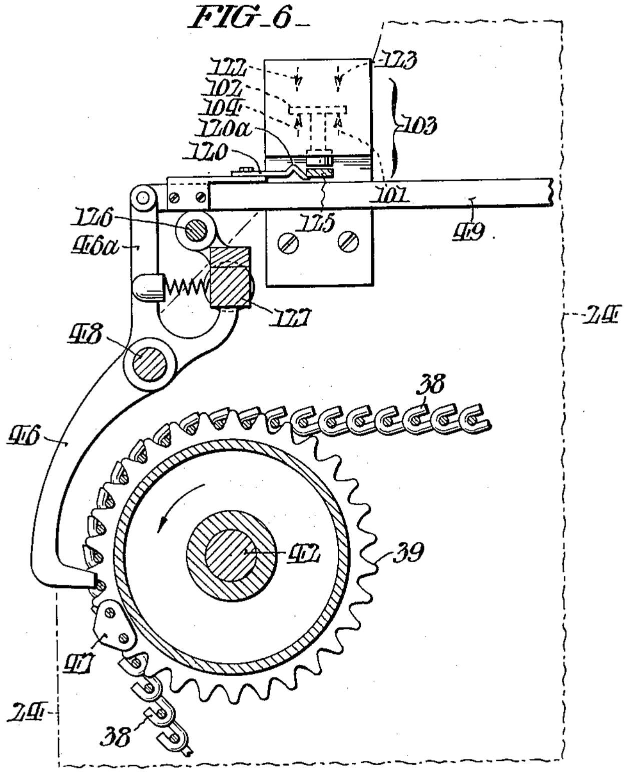
Figure 7:
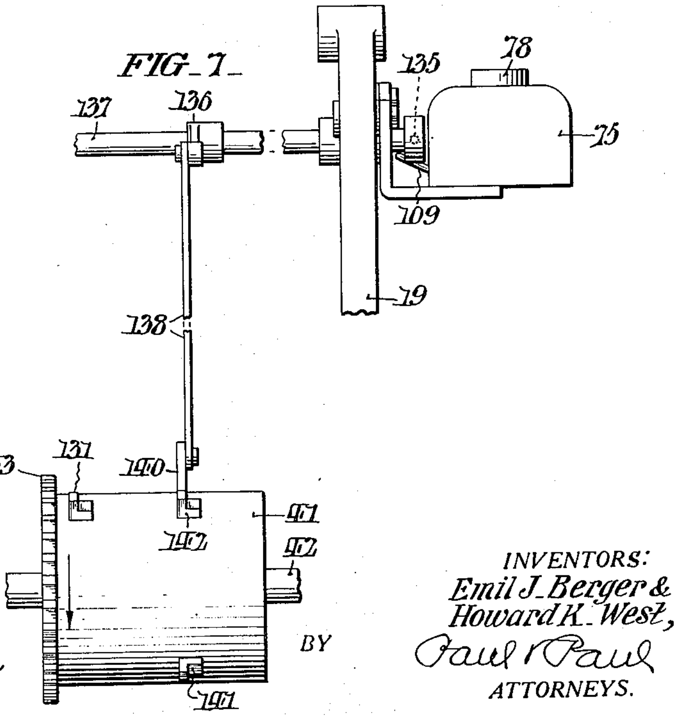
Fig. 7 is a broken out fragmentary view in elevation looking as indicated by the angled arrows VII—VII in Fig. 3.

As an additional means for actuating the supplemental switch 103, we have provided a bell crank lever 125 which is secured to a rock shaft 126 journalled in an inward bearing bracket projection 127 on the side frame 24, see Fig. 5. As shown, one arm of the bell crank 125 underreaches the contact plunger of switch 103, and the other carries an adjustable screw 128 which rests on a finger 129. This finger 129 is free on fixed stud 130 and rests on the drum 41 in the path of a cam rise or rises such as the one indicated at 131. This latter provision is made for slowing down the machine during other phases of the knitting as for example at the beginning of a stocking blank when the setting up course is formed.

The supplemental switch 109 is arranged to be actuated by a finger 135 which together with an arm 136, is secured to a rock shaft 137 suitably journalled in the machine framework. By means of a drop link 138, the arm 136 is connected to a finger 140 which is also free on the stud 130 and rests on the drum 41 in the path of two circumferentially spaced cam projections 141 and 142. The purpose of the arrangement just described is to automatically stop the machine for welt turning, and again after the end of a knitting cycle upon completion of a stocking blank. Thus, assuming the machine to be operating at high speed after having been started as before explained by means of the button 76, through lifting of the finger 140 by the first cam rise 141 on drum 41, the supplemental switch 109 will be opened to break the circuit through lead 107 contact 108 of supplemental switch 109 will be opened to break the circuit through lead 107 contact 108 of supplemental switch 109, lead 110, relay contact 84, leads 114 and 96, relay coil 97 and conductor 98 with interruption, as a consequence, of current flow to the motor 50 to stop the machine for welt turning. After the welt turning is accomplished, the machine is re-started by pushing the button 76, and when the cam rise 142 of drum 41 arrives at the finger 140, the supplemental switch 107 is again opened to cause automatic stoppage of the motor 50 upon completion of the stocking blank.

Figures 14, 15:
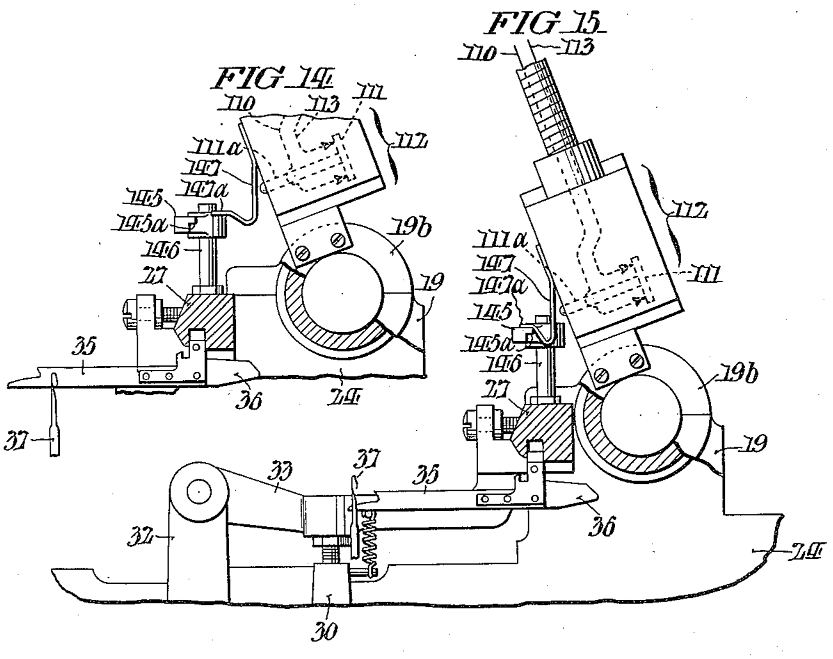
Figs. 14–17 are fragmentary views in section corresponding to Fig. 3 showing the catch bar of the machine in different positions assumed thereby during its actuation.
Figures 16, 17:
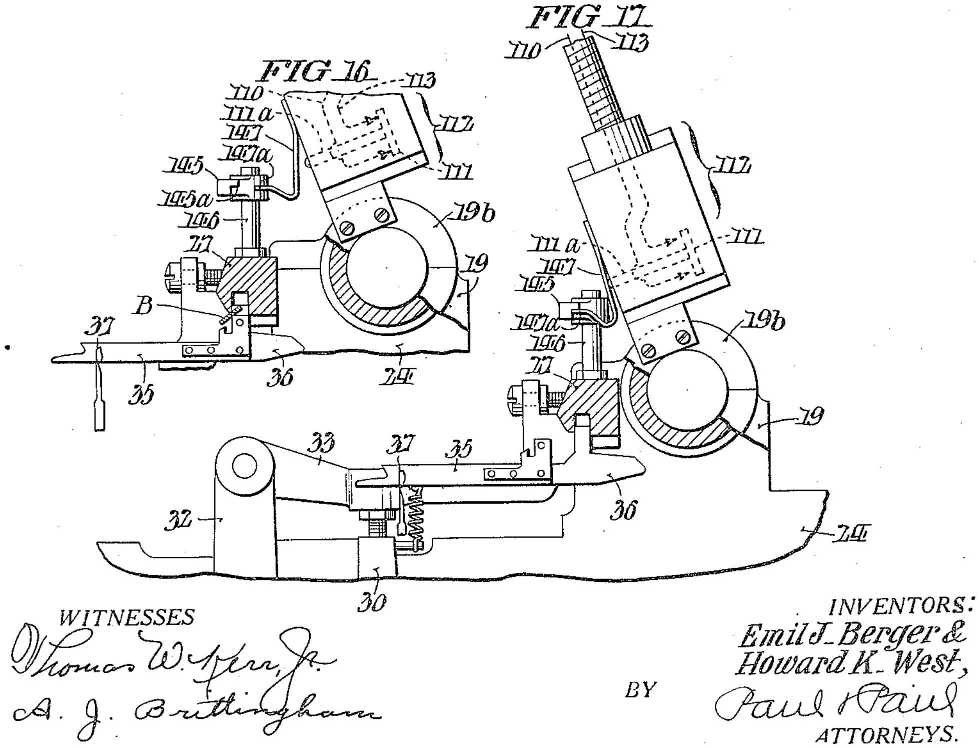

The supplemental switch 112 is fixedly secured to a boss 19*b* at the top of side frame 19, see Fig. 3, and is arranged to be actuated under certain conditions presently set forth, by a finger 145 which is adjustably set upon a stud 146 upstanding from the catch bar 27, and which is undercut as at 145*a*. When the catch bar 27 moves inward or to the right as in Fig. 15, the finger is advanced to engage the laterally projecting end 147*a* of one leg of a V spring 147. The other leg of this spring is secured at its end to the casing of switch 112 with its free portion overlying the protruding end of the plunger 111*a* of switch contact 111. In Fig. 14, the catch bar 27 is in its forward position and lowered in readiness to retract the sinkers and dividers. In Fig. 15, the catch bar has performed that function and is raised to clear the butts of the sinkers 36. During the normal operation of the machine and rise of the finger 145, the free end of spring is engaged and lifted slightly without affecting the switch 112. However, in the event that an obstruction, such as a broken sinker or divider butt such as indicated at B in Fig. 16, should prevent descent of the catch bar 27, the latter will be held raised while being moved inward. Thus as the catch bar 27 nears the end of its rightward retractive shift, the finger 145 will directly engage the projecting end 147*a* of spring 147, causing the latter to be compressed to a maximum extent as in Fig. 17 with consequent opening of supplemental switch 112. When this happens, it will be seen from Fig. 3 that current flow to either of the two motors 50 or 51 which may be running at that time will be immediately interrupted and and the machine thereby brought to a stop.

Having thus described our invention, we claim:

1. Drive mechanism for a straight knitting machine of the character described having a drive shaft, knitting instrumentalities deriving their movements from the drive shaft, and an intermittently racked narrowing chain, said drive mechanism comprising a high speed electric motor for normally powering the machine, a normally inactive slow speed electric motor mechanically coupled with the high speed motor; a drive connection between a fixed wheel on the shaft of one of the motors and a self-releasing overload clutch wheel on the drive shaft of the machine, an electric wiring circuit for the motors, and current flow control devices in said circuit including a switch constructed and arranged to be actuated from the narrowing chain to automatically cut out the high speed motor and to cut in the slow speed motor for immediate reduction in the speed of the machine and slower operation during the narrowing phases of a knitting cycle.

2. The invention according to claim 1, further including manually operable starting and stopping switches interposed in the circuit, together with a switch whereby the circuit can be controlled for jogging of the machine under the power of either one of the two motors.

3. The invention according to claim 1, in which the machine also has an intermittently rotated timing drum, and further comprising a supplemental switch means constructed and arranged to be automatically actuated from the timing drum to interrupt current flow in the entire circuit for stoppage of the machine at the completion of the knitting cycle.

4. The invention according to claim 1, in which the machine also has an intermittently rotated timing drum, and further comprising means whereby the switch is automatically actuated from the timing drum for slower operation during other phases of the knitting cycle.

5. The invention according to claim 1, in which the machine is provided with needles and cooperative sinkers and a catch bar for actuating the sinkers; and further including another switch in the wiring circuit arranged to be automatically actuated by the catch bar in the event that it is prevented from descending over the butts of the sinkers, to interrupt current flow in said circuit.

6. The invention according to claim 1, wherein the mechanical coupling between the two motors comprises pulleys affixed respectively to the shafts of said motors, and a belt connecting said pulleys.

7. The invention according to claim 1, wherein a second wheel affixed to the shaft of the high speed motor is connected by a belt with the self-releasing overload clutch wheel on the drive shaft of the machine.

EMIL J. BERGER.
HOWARD K. WEST.

REFERENCES CITED

The following references are of record in the file of this patent:

UNITED STATES PATENTS

| Number | Name | Date |
|---|---|---|
| 1,754,681 | Howie | Apr. 15, 1930 |
| 2,003,766 | Zwicky | June 4, 1935 |
| 2,281,569 | Fritsche | May 5, 1942 |
| 2,343,485 | Start et al. | Mar. 7, 1944 |
| 2,405,583 | Lambach | Aug. 13, 1946 |